United States Patent
Roustant

(10) Patent No.: US 10,324,991 B2
(45) Date of Patent: Jun. 18, 2019

(54) SEARCH PROMOTION SYSTEMS AND METHOD

(71) Applicant: salesforce.com, inc., San Francisco, CA (US)

(72) Inventor: Bruno Roustant, Froges (FR)

(73) Assignee: salesforce.com, inc., San Francisco, CA (US)

( * ) Notice: Subject to any disclaimer, the term of this patent is extended or adjusted under 35 U.S.C. 154(b) by 300 days.

(21) Appl. No.: 15/149,346

(22) Filed: May 9, 2016

(65) Prior Publication Data

US 2017/0124203 A1    May 4, 2017

Related U.S. Application Data

(60) Provisional application No. 62/248,692, filed on Oct. 30, 2015.

(51) Int. Cl.
*G06F 16/335* (2019.01)
*G06F 16/9535* (2019.01)

(52) U.S. Cl.
CPC ........ *G06F 16/9535* (2019.01); *G06F 16/335* (2019.01)

(58) Field of Classification Search
CPC ................................................ G06F 17/30867
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |
| 6,324,568 | B1 | 11/2001 | Diec et al. |

(Continued)

*Primary Examiner* — Kris E Mackes
(74) *Attorney, Agent, or Firm* — Lorenz & Kopf, LLP

(57) ABSTRACT

A method for presenting search results is provided. The method receives a user input search query; obtains, from a search engine, a first set of search results responsive to the user input search query; efficiently identifies a promoted set of search results for promotion using a set of search promotion rules, each of the set of search promotion rules including a set of terms and one or more document identifiers; revises the first set of search results, based on the identified promoted set, to create a second set of search results; and presents the second set of search results, wherein the second set of search results includes the first set of search results and the promoted set in a promoted position.

12 Claims, 9 Drawing Sheets

(56) References Cited

U.S. PATENT DOCUMENTS

| | | |
|---|---|---|
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,809,709 B1 * | 10/2010 | Harrison, Jr. ..... G06F 17/30867 707/603 |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0033292 A1 * | 2/2003 | Meisel ............. G06F 17/30864 |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0120292 A1 * | 5/2008 | Sundaresan .......... G06F 16/355 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2010/0205126 A1 * | 8/2010 | Andersen ................ G06F 17/10 706/13 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |

\* cited by examiner

SEARCH PROMOTION SYSTEMS AND METHOD

CROSS-REFERENCE TO RELATED APPLICATION

This application claims the benefit of U.S. provisional patent application Ser. No. 62/248,692, filed Oct. 30, 2015.

TECHNICAL FIELD

Embodiments of the subject matter described herein relate generally to document search strategies, and more particularly, to systems and methods for promoting search results based on various criteria.

BACKGROUND

Systems for searching and organizing the Internet are, not surprisingly, extremely important in today's world for finding articles relevant to a particular search query. Furthermore, it is often desirable to dynamically promote some relevant articles on each search, according to certain rules. For example, it is possible to define a promotion rule including various terms and then directly promote the most relevant article associated with that rule as the first search result. Thus, a user searching for a query containing the search terms or keywords, in any order, will match the promotion rule and will result in the correct article being promoted as the first search result.

Known methods for matching promotion rules are unsatisfactory in a number of respects. For example, such methods are generally not efficient and not scalable to thousands of promotions. Some systems, for example, examine matching rules with a brute force, linear iteration over all rules, and support only full-query matching. That means that the promotion rule will be matched only if the search query is exactly the same and in the same order as the search terms. This method also requires scanning all rules sequentially, which take a prohibitive length of time for thousand of such rules.

Accordingly, methods and systems are desired for improved rule-based promotion of search results.

BRIEF SUMMARY

Some embodiments of the present disclosure provide a method for presenting search results. The method receives a user input search query; obtains, from a search engine, a first set of search results responsive to the user input search query; identifies a promoted set of search results for promotion using a set of search promotion rules, each of the set of search promotion rules including a set of terms and one or more document identifiers; revises the first set of search results, based on the identified promoted set, to create a second set of search results; and presents the second set of search results, wherein the second set of search results includes the first set of search results and the promoted set in a promoted position.

Some embodiments provide a computer system implemented as a server, the computer system including: a memory element, configured to store a set of search promotion rules, each search promotion rule including a set of terms and a corresponding document identifier; a network communication device, configured to receive a search-query and to transmit search results; and at least one processor, communicatively coupled to the memory element and the network communication device, the at least one processor configured to: obtain, from a search engine, a first set of search results responsive to the user input search query; identify a promoted set of search results for promotion using a set of search promotion rules, each of the set of search promotion rules including a set of terms and one or more document identifiers; revise the first set of search results, based on the identified promoted set, to create a second set of search results; and initiate transmission, via the network communication device, of the second set of search results, wherein the second set of search results includes the promoted set in a promoted position.

Some embodiments provide a non-transitory, computer-readable medium containing instructions thereon, which, when executed by a processor, are capable of performing a method. The method defines a set of search promotion rules applicable to presentation of search results according to a promotion sequence; identifies promoted search results of a set of documents managed by a search engine; adjusts a presented list based on the promoted search results, to generate an adjusted list that corresponds to the promotion sequence; and presents the adjusted list.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Embodiments of the subject matter described herein generally relate to systems and methods for promoting search results, such as individual search results referencing documents known to be particularly relevant to a search query entered by a user. In accordance with one embodiment, search promotion rules are defined (e.g., by a user or administrator), such that each rule includes a set of terms (e.g., search terms such as "2015", "Tesla", etc.) and one or more corresponding document IDs (e.g., one or more links to a web page available on the Internet). These rules are used to populate a subset-matcher dataset having a trie data structure. Subsequently, when a query is received from a user, the subset-matcher dataset is browsed quickly to determine a set of rules that match the given query (e.g., rules in which the terms "2015" and "Tesla" both appear, in any order). The documents associated with the set of matching rules are then "promoted" by, for example, listing them at the top of search results that are displayed for the user.

Figure 1:
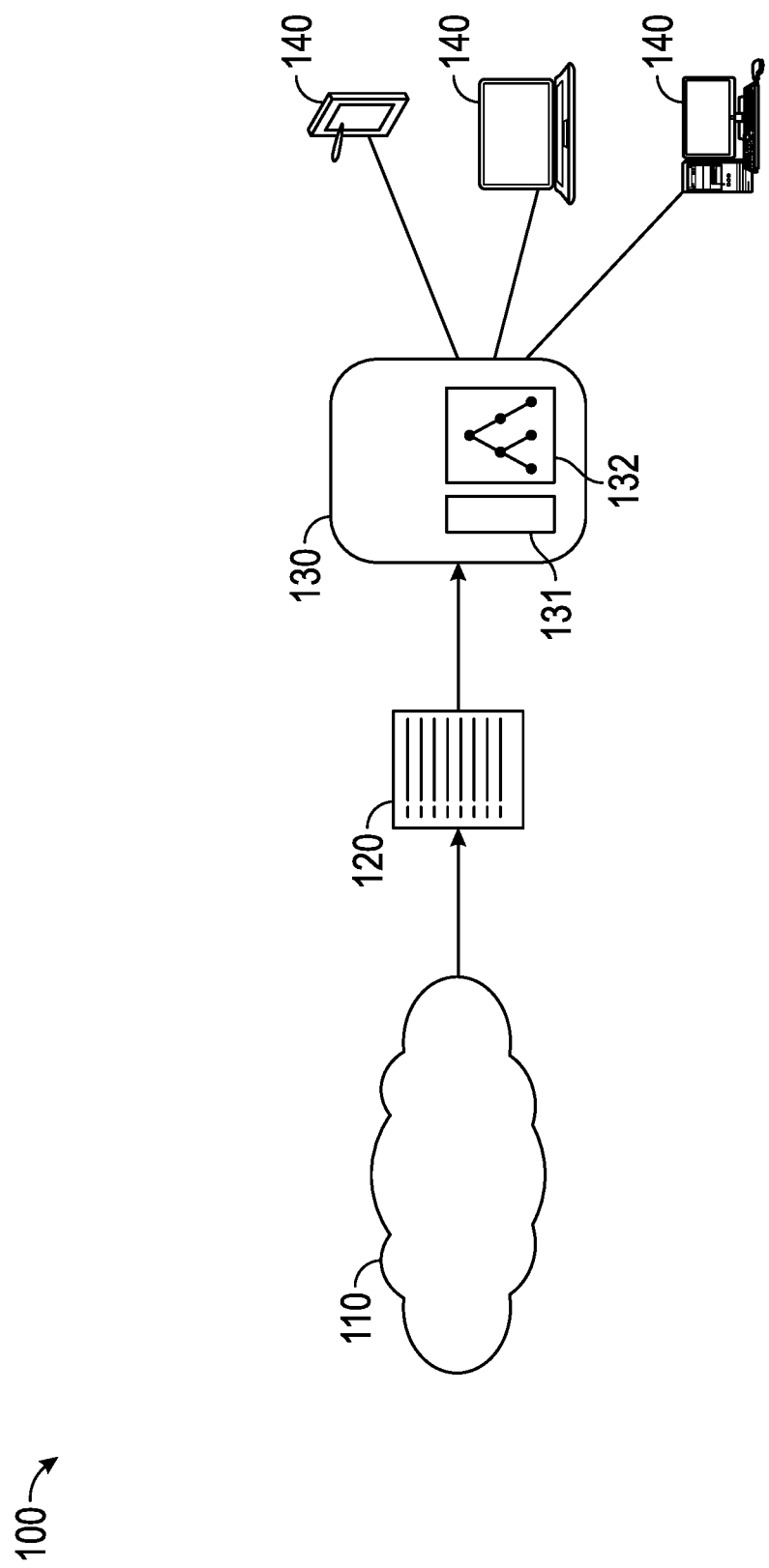
FIG. 1 is conceptual block diagram depicting a system and computing devices in accordance with an example embodiment.

Referring now to the conceptual block diagram depicted in FIG. 1, a search promotion system (or simply "system") 100 in accordance with one embodiment generally includes a search promotion server (or simply "server") 130 having a subset-matcher module 131 and a subset-matcher dataset 132 stored therein. Communicatively coupled to search promotion server 130 are a plurality of computing devices (or simply "devices") 140 and a network 110 (e.g., the Internet).

The search promotion server 130 may be implemented using any suitable combination of hardware and software and may correspond to any of a variety of database system types, including, for example, a multi-tenant system as described in further detail below in connection with FIG. 10. The range of embodiments are not so limited, however, and the search promotion server 130 may be implemented using any suitable computer system that includes at least one processor, some form of system memory, and input/output (I/O), such as a network communication device for transmitting and receiving data via the network 110. Similarly, devices 140 may include any combination of hardware and software configured to access the search promotion server 130 and to provide a user interface (via a suitable display and input/output components) that allows a user to interact with various applications executable by devices 140. Devices 140 may correspond, for example, to a desktop computer, a laptop computer, a tablet computer, a smartphone, or the like.

Figure 2:
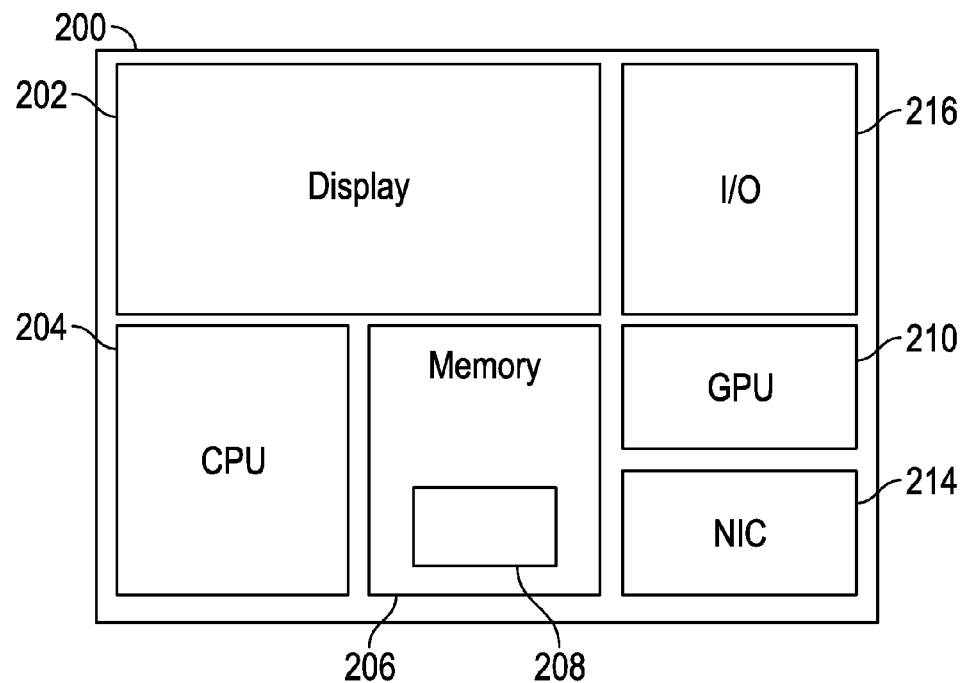
FIG. 2 is a conceptual block diagram illustrating an exemplary computing device, in accordance with the disclosed embodiments.

In this regard, FIG. 2 illustrates an example device 200 of the type that might be used to implement one or more of devices 140 as in FIG. 1 and to provide a user interface for interacting with search promotion server 130, such as a web browser configured to receive a search query and to display a list of search results (some of which may be "promoted" as described herein) that are relevant to that query. As shown, device 200 generally includes a display (e.g., a touch-screen display) 202, a central processing unit (CPU) 204, one or more memory components 206, a graphics programming unit (GPU) 210, a network interface component 214 (e.g., a WiFi, Ethernet, or other such interface), and one or more input/output interfaces 216. CPU 204 is configured to execute machine readable software code 208 (which might correspond to any and all of the various software components described herein) and, via GPU 210, render graphics on display 202. GPU 210 may include any of the various GPU components known in the art that are capable of interfacing with CPU 204 (via an appropriate GPU application programming interface, or "API") to render displayable components on to display 202. In the context of a user interface employing a web browser, for example, Such displayable components might include, without limitation, various text components, image components (e.g., JPG, PNG, etc.), video components (e.g., AVI, animated-GIFs, etc.), interactive user interface components (e.g., buttons, text entry regions), and widgets (such as date-picker and calendar widgets). Such displayable components, as is known in the art, may be produced by a web browser configured to parse and render web resources such as hypertext transfer markup language (HTML) files, cascading style sheet (CSS) files, Javascript code, and other such files used to render websites. Suitable browsers include, for example, Microsoft Internet Explorer, Mozilla Firefox, Google Chrome, Apple Safari, Opera, or the like. Similarly, browser 230 may implement a variety of application programming interfaces (APIs) and include any suitable layout engine, such as the Webkit layout engine.

As shown in FIG. 1, search promotion server 130 is configured to receive an input data set (or simply "input") 120 corresponding to, in one embodiment, search results produced by a search engine (such as Google, Bing, etc.) in connection with documents (a term used without loss of generality) available via a network 110 (e.g., the Internet). That is, the input dataset 120 will generally include an ordered list of documents as well as indicia relating to those documents, such as html links and the like. A subset of the text associated with each document might also be returned by the search engine. As mentioned previously above, embodiments of the present subject matter or configured to "promote" certain documents based on the received search query. The promoted documents may or may not be found within input dataset 120.

Figure 3:
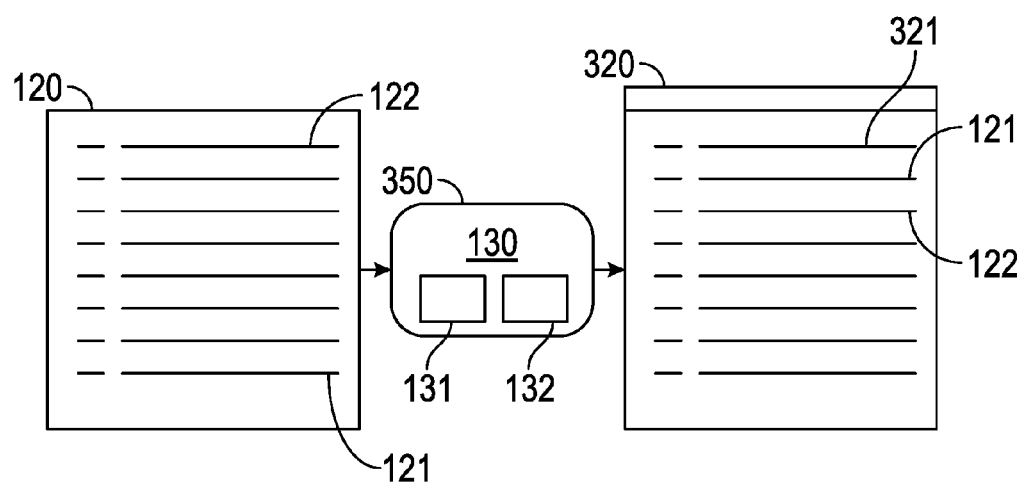
FIG. 3 illustrates, conceptually, the promotion and display of documents related to a search result, in accordance with the disclosed embodiments.

More particularly, FIG. 3 depicts, conceptually, what is meant by "promotion" of search results. As shown, the input dataset 120 will generally include a list of documents, including listed items 121 and 122 (including, among other things, hypertext links). Search promotion server 130 receives input dataset 120 as well as a search-query 350. Based on that query, search promotion server 130 utilizes the subset-matcher dataset 132 and subset-matcher module 131 (FIG. 1) to provide search results 320 to a user. In the illustrated embodiment, item 122—which was originally located at the "top" of input dataset 120 (that is, Google or another search engine considered it to be most relevant)—has now been shifted down the displayed set of search results 320. At the same time, item 121 has been promoted to second place, and another document (item 321, which was not included within the input dataset 120) has been promoted to the top of the list of search results 320. Thus, the phrase "search promotion" as used herein means displaying for the user a list of search results based on, but which differs in order and/or content relative to, the "baseline" search results produced by the search engine (e.g., input dataset 120).

Each of the items in the set of search results 320 is presented according to the item's rank in sequence. Here, item 321 has a rank that is higher than each of the other items of the search results 320, and is promoted to the top-most position in the sequence of displayed search results 320. Item 121 has the second-highest rank of the search results 320, and is promoted to the second-highest position in the sequence of displayed search results 320. Item 122 is shifted down the list or sequence by the number of promoted documents inserted at the top of the displayed search results 320. In other words, item 122 is originally displayed at the top of the input dataset 120, and when two "promoted" items (e.g., item 321 and item 121) are inserted at the top of the display of search results 320, then item 122 has been shifted down by two positions in the sequence of the displayed search results 320.

Figure 4:
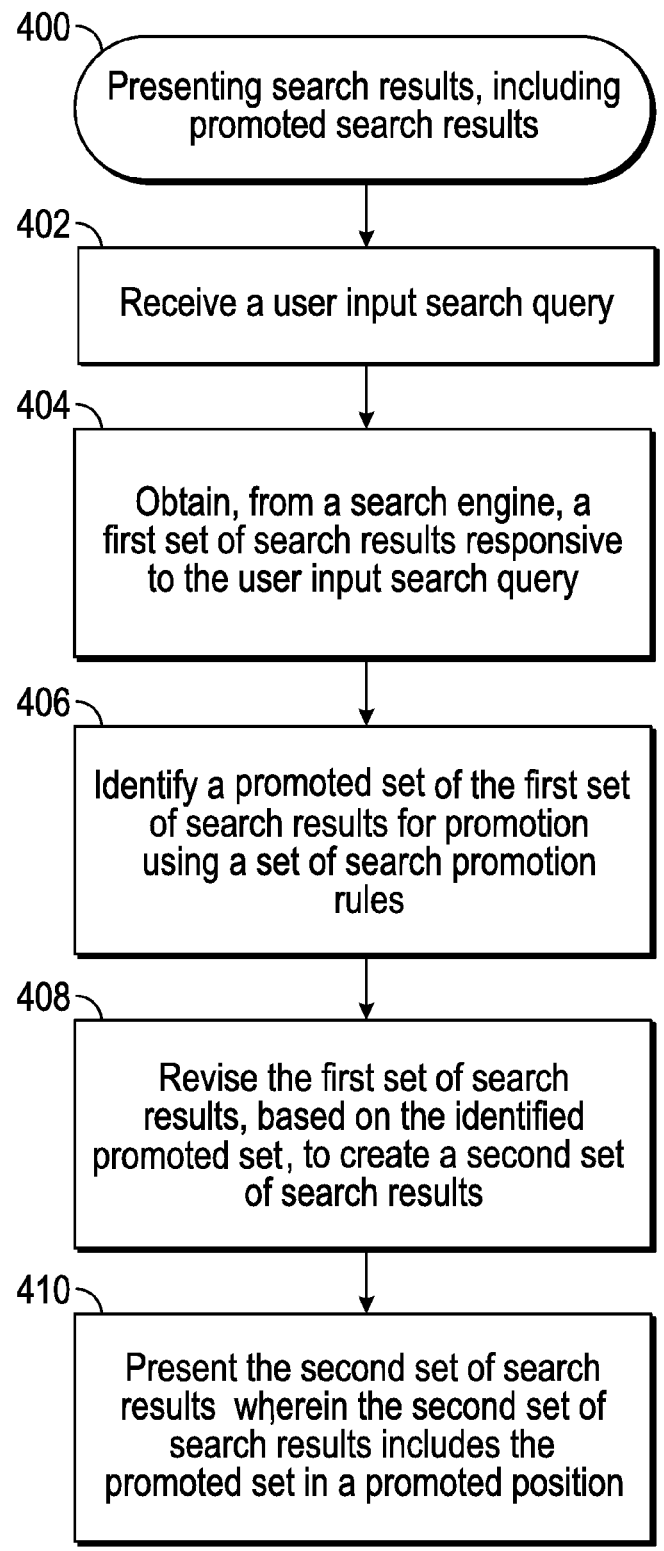
FIG. 4 is a flow chart that illustrates an embodiment of a process for presenting search results, including promoted search results.

FIG. 4 is a flow chart that illustrates an embodiment of a process 400 for presenting search results, including promoted search results. First, the process 400 receives a user input search query (step 402). The user input search query is generally received at a server (see reference 130, FIGS. 1, 3), and in certain embodiments, the user input search query is received at the server via a computing device (e.g., reference 140, FIG. 1 and reference 200, FIG. 2) in communication with the server and acting as a user interface for interaction with the server. Next, the process 400 obtains, from a search engine, a first set of search results responsive to the user input search query (step 404). The first set of search results includes any search results, ordered by the search engine, that are received in response to the user input search query.

The process 400 then identifies a promoted set of search results for promotion, using a set of search promotion rules (step 406). Each of the search promotion rules are associated with a document (see FIG. 6) which may be indicated for promotion by the user input search query. In this step, the process 400 uses the user input search query and the predefined set of search promotion rules to identify a portion of the search results for promotion, which may or may not be included in the first set of search results. In other words, existing search promotion rules indicate that certain documents should be "promoted" or displayed more prominently in a set of search results, and the user input search query is used to identify one or more of these "promotable" documents as applicable to this particular situation.

Next, the process 400 revises the first set of search results based on the identified promoted set, to create a second set of search results (step 408). The process 400 then presents the second set of search results, wherein the second set of search results includes the promoted set in a promoted position (step 410). Here, the process 400 alters the order of presentation of the first set of search results, and promotes the identified promoted set in the presentation.

Figure 5:
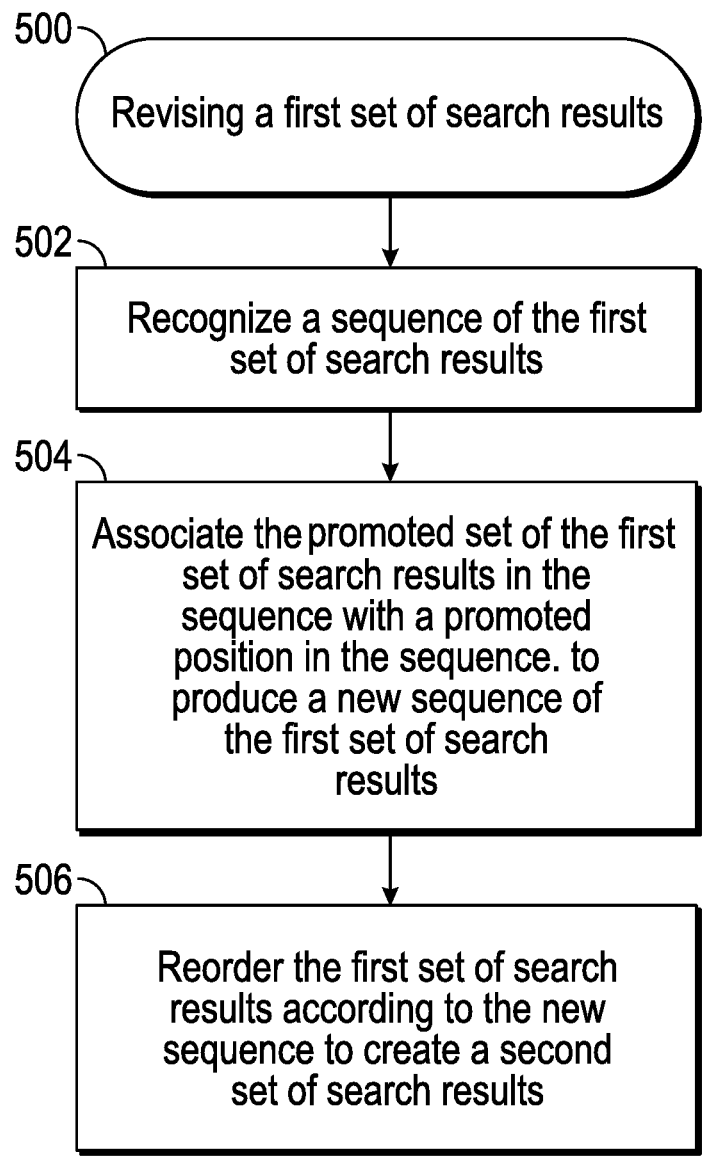
FIG. 5 is a flow chart that illustrates an embodiment of a process for revising a first set of search results to create a second set of search results.

FIG. 5 is a flow chart that illustrates an embodiment of a process 500 for revising a first set of search results to create a second set of search results. First, the process 500 recognizes a sequence of the first set of search results (step 502). Here, the process 500 observes the order (i.e., sequence) of the first set of search results obtained, via search engine, in response to a user input search query.

Next, the process 500 associates the promoted set of search results in the sequence with a promoted position in the sequence, to produce a new sequence of the first set of search results (step 504). In this step, the process 500 has identified the promoted set of search results for promotion, and associates each of the promoted set with an appropriate position that has been reserved for promoted results. Generally, these promoted positions include the top positions in the list, and when more than one document (i.e., search result) is identified for promotion, then a number of top positions in the list appropriate to the number of promoted documents is associated by the process 500. The process 500 then reorders the first set of search results according to the new sequence, to create a second set of search results (step 506).

Figure 6:
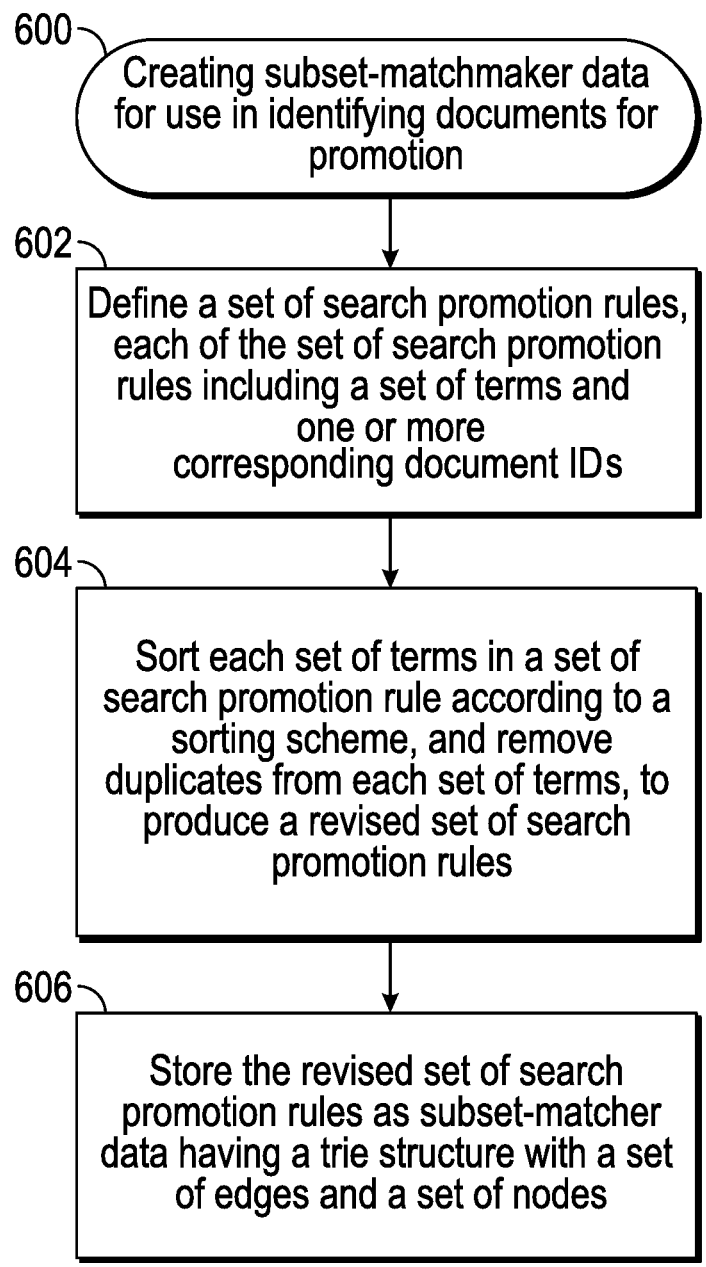
FIG. 6 is a flow chart that illustrates an embodiment of a process for creating subset-matcher data for use in identifying documents for promotion.

FIG. 6 is a flow chart that illustrates an embodiment of a process for creating subset-matcher data for use in identifying documents for promotion. As illustrated, process 600 includes first defining (step 602) a set of rules, each including a set of terms and one or more corresponding document IDs. In most contexts, the "terms" of the rule will be alphanumerical strings (e.g., "best", "risotto", "phoenix"), but may be any other form of input that a user might provide in a search query, such as an image, a video, a spoken phrase, or the like.

The phrase "document ID" is used in a general sense to refer to any identifier of a particular document available over the network of interest. In many cases, the one or more document identifiers will correspond to a hypertext link, but might also refer to a document available in a local server or other datastore (e.g., search promotion server 130 in FIG. 1). Multiple documents may be promoted by a single search promotion rule. For example, rules may be expressed as follows:

Rule 1: [2015, dreamforce]→ID123456
Rule 2: [2016, dreamforce]→ID234567
Rule 3: [pay, bill]→ID444444

In the above example, the first and second rules may be generally aimed at catching queries that ask about a Dreamforce event (e.g., "where is the 2015 Dreamforce event being held"), while the third rule is generally aimed at catching queries in which the user is attempting to pay a bill for goods or services (e.g., "how can I pay my bill for online services"). In the first two cases, the document IDs may take the user to web pages corresponding to the listed events, while the third may take the user to an article (or other information) that provides the user with a way to pay his or her bill.

Referring again to FIG. 6, after the rules have been defined in step 602, each of the search terms are sorted (step 604). For example, rule 3 ([pay, bill]→ID444444) would become [bill, pay]→ID444444. Subsequently, in step 604, duplicate terms (if any) are removed. Both of these steps assist in creating a trie data structure, as described in further detail below. The rules may be sorted according to any sorting scheme. In certain embodiments, when the terms include alphanumeric strings, the sorting scheme may be implemented as alphanumeric ordering. Other embodiments may perform sorting using any other applicable sorting scheme. The only constraint for implementation of the process 600 is to apply the same sorting scheme to sorting (1) rules terms and (2) query terms.

Figure 8:
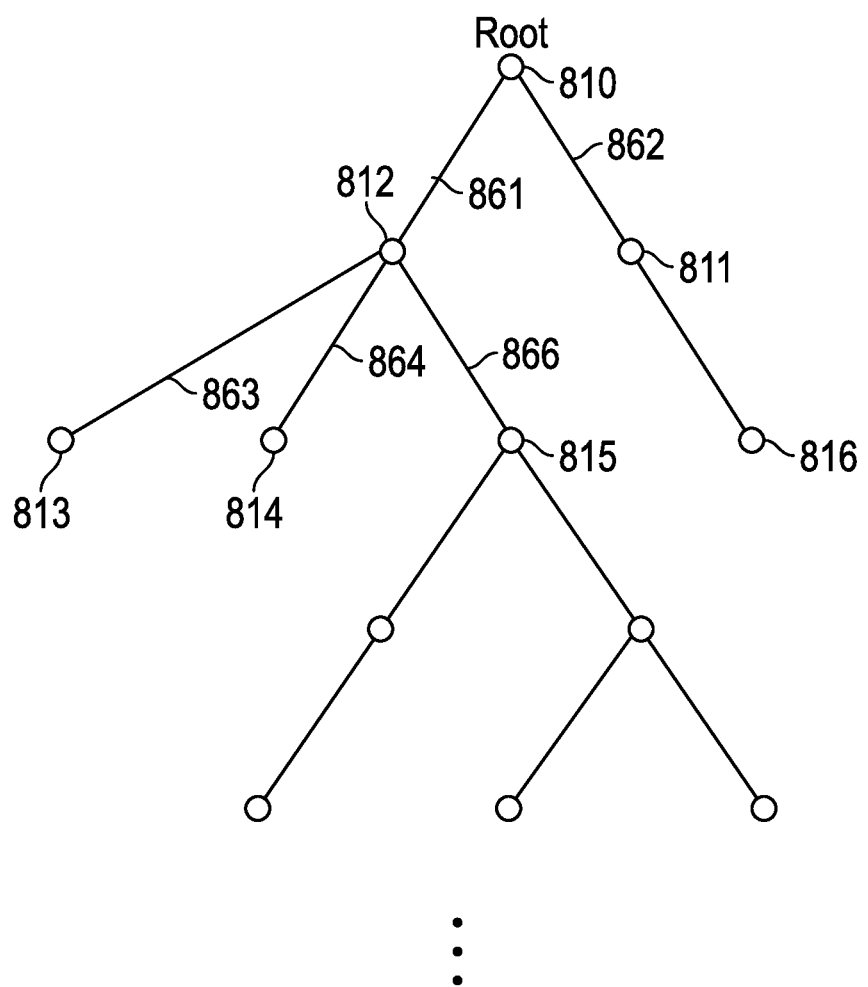
FIG. 8 depicts an example trie data structure, in accordance with the disclosed embodiments.

In step 606, the rules are placed within a trie data structure to create the subset-matcher dataset (132 in FIG. 1). As is known in the art, a "trie" data structure (also known as a "radix" or "prefix" tree) is a special type of ordered "tree" data structure in which the keys are usually strings. Unlike a traditional binary tree, no single node in the tree stores the key associated that node; rather, its position in the tree defines the key. FIG. 8 depicts an example trie data structure 800, in which "nodes" (810-816) are designated as open circles and "edges" (861-866) are denoted by line segments. Traversing a set of edges to reach a particular note effectively defines the key for that node. Thus, for example, node 814 is reached (in order) via edges 861 and 864. If edge 861 is labeled "a", and edge 864 is labeled "b", then node 814 has the key "ab." As will be appreciated, a trie data structure such as 800 is particularly easy to search when the edges correspond to strings. In essence, a trie structure such as that shown in FIG. 8 is characterized by a logical "and" between terms of the same branch, and a logical "or" between different branches.

Figure 9A:
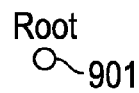
FIGS. 9A-9D depict one example of the creation of subset-matcher data, in accordance with the disclosed embodiments.
Figure 9B:
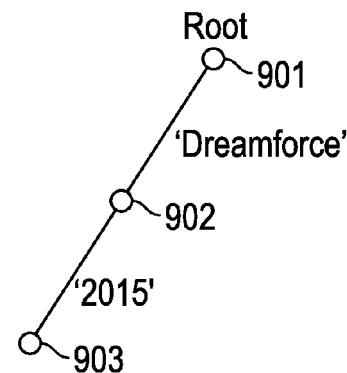
Figure 9C:
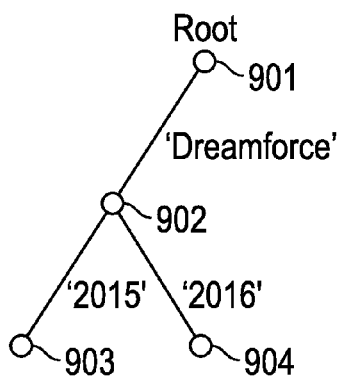
Figure 9D:
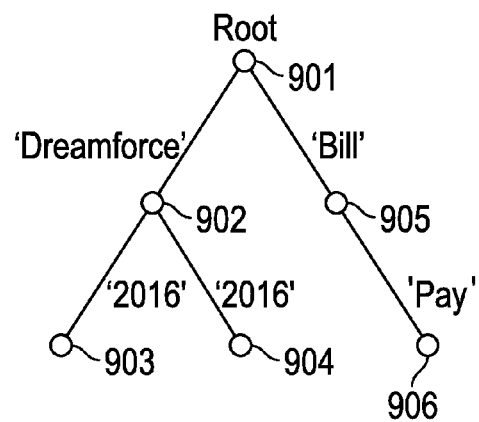

For example, FIGS. 9A-9D depict the creation of a trie data structure for the example rules listed above, in which every node corresponds to a document ID (not illustrated for clarity), and each edge corresponds to a search term. First, in FIG. 9A, a root node 901 is defined. Next, in FIG. 9B rule 1 is added, resulting in a node 902 with an edge labeled 'dreamforce' connected back to root node 901, and a node 903 having an edge '2015' connected to node 902. In FIG. 9C, rule 2 is added, resulting in the addition of a node 904 connected to node 902 via an edge labeled '2016'. Finally, in FIG. 9D, a node 905 is connected to root node 901 via an edge and a node 906 is connected to node 905 via an edge 'pay'.

Figure 7:
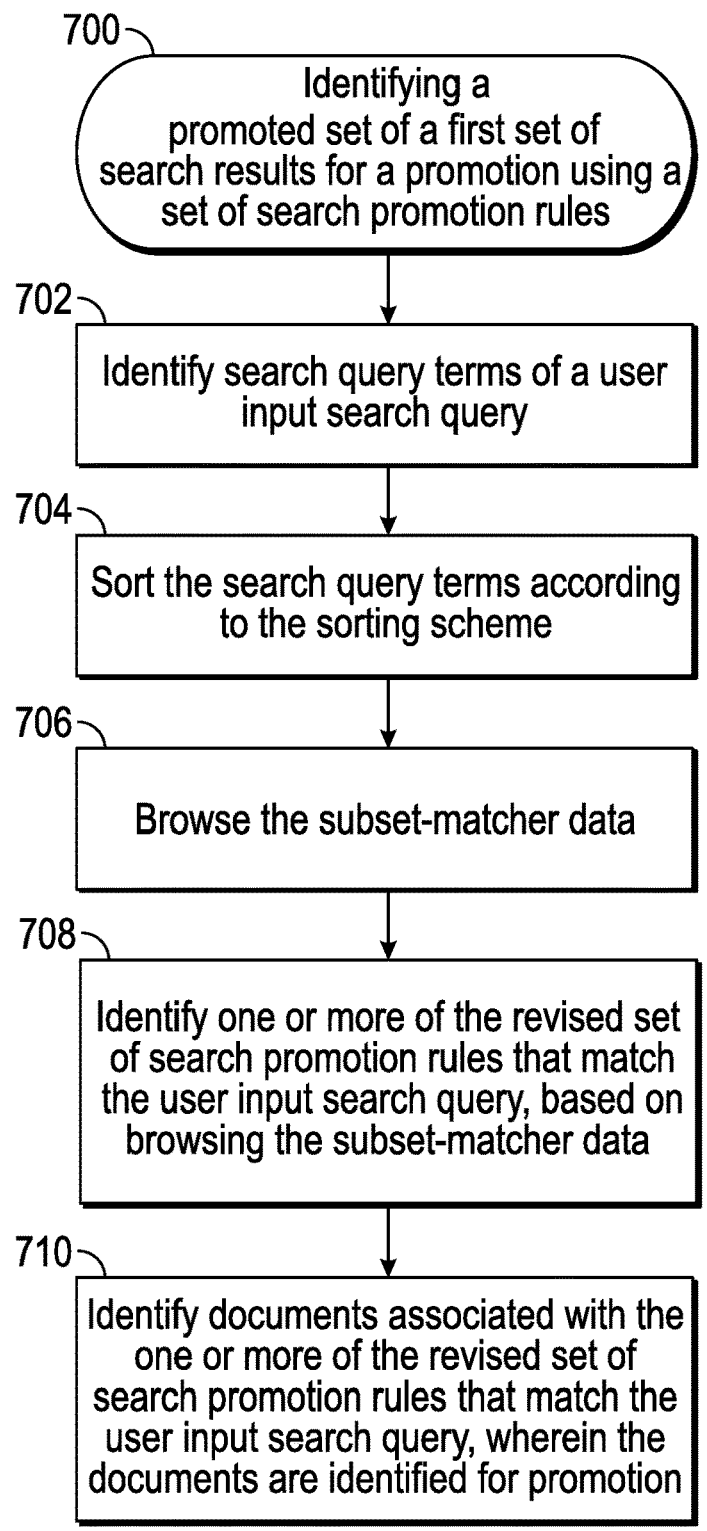
FIG. 7 is a flow chart that illustrates an embodiment of a process for identifying a promoted set of a first set of search results for promotion using a revised set of search promotion rules.

As will be appreciated, the data structure of FIGS. 9A-9D can be searched very quickly for a particular string. In that regard, FIG. 7 is a flowchart depicting a search strategy utilized with the subset-matcher data of FIG. 6. In general, the process 700 includes identifying search query terms associated with a user input search query, such as "pay my bill" (step 702), sorting the terms of the query (step 704) according to the same sorting scheme used in sorting the terms of the rules (described previously with regard to FIG. 6), browsing the subset-matcher data (step 706) to identify the revised set of search promotion rules that match the user input search query (step 708), and then identifying documents associated with the document IDs of the matching set of rules (step 710).

The search strategy illustrated by process 700 of FIG. 7 is a subset matching algorithm. For process 700, given a set s of query terms (each term is an element of the set), all elements in the set can be compared and ordered (e.g. lexicographically). For example, the following pseudocode presents a detailed method applicable to process 700.

```
remove duplicates in s
sort s
keep a queue Q of current nodes
Add root node to Q
Another queue Q' will hold the child nodes (initially empty)
Matching promoted document IDs will be stored in list M (initially empty)
for each element e in s {
  for each current node in Q {
    if current node has a child for edge e {
      add the child to Q'
      record the child matching document IDs by adding them to M
    }
    if e is (lexicographically) greater than or equal to current node greatest
    edge
    {
      remove current node from Q (as we are sure this current node children
cannot match anymore)
    }
  }
  Move all child nodes from Q' to Q
}
All promoted documents are eventually contained in M
```

Significantly, the time required to search for a particular rule is greatly reduced over prior art "brute force" methods. Given a search-query (350 in FIG. 3) having Q terms, the time spent to match all promotion rules does not depend on the number of promotion rules or the number of terms in the rules. The time only depends upon Q (in big-O notation: $O(Q^3)$). In some embodiments, testing has shown that matching a standard query (e.g., less than ten terms) against any number of rules (e.g., thousands of rules, hundreds of thousands of rules) requires a constant time, less than 0.05 ms, even on relatively modest computer hardware.

While FIG. 7 presents an exemplary method of searching through the subset-match data on a high level, the following pseudocode presents a sample execution of the algorithm detailed above, in which two different queues (Q and Q') are used to traverse the trie structure. This example assumes a user query of "dreamforce san francisco 2016" and a subset-match data shown in FIG. 7.

```
sort the query => [dreamforce francisco san 2016].
define queue of reached nodes Q[ ].
Add root to Q => Q[root (901)].
Another queue Q'[ ] to hold the child nodes, initially empty.
A list M[ ] to store the matching document IDs, initially empty.
For first query term "dreamforce",
..for node root (901) in Q,
....root (901) has an edge for query term "dreamforce" to node 902,
....so add child node 902 to Q'
....(no matching rule for node 902)
..(end for)
..move all child nodes from Q' to Q
..=> Q[901, 902] Q'[ ]
For second query term "francisco"
..for node root (901) in Q,
....root (901) has no edge for "francisco"
..for node 902 in Q,
....902 has no edge for "francisco"
..(end for)
..(Q' is empty)
..=> Q[901, 902] Q'[ ]
For third query term "san"
..for node root (901) in Q,
....root (901) has no edge for "san"
..for node 902 in Q,
....902 has no edge for "san"
..(end for)
..(Q' is empty)
..=> Q[root (901), 902] Q'[ ]
For fourth query term "2016"
..for node root (901) in Q,
....root (901) has no edge for "2016"
..for node 902 in Q,
....902 has an edge for "2016" to node 904,
....so add child node 904 to Q'
....904 has a matching rule "2016 dreamforce", record the corresponding
document ID in M[ ]
..(end for)
..move all child nodes from Q' to Q
..=> Q[root (901), 902, 904] Q'[ ]
(end for, no query terms)
M[ ] contains the matching document ID for the rule "2016 dreamforce".
```

The various tasks performed in connection with processes 400-700 may be performed by software, hardware, firmware, or any combination thereof. For illustrative purposes, the preceding description of processes 400-700 may refer to elements mentioned above in connection with FIGS. 1-3. In practice, portions of processes 400-700 may be performed by different elements of the described system. It should be appreciated that processes 400-700 may include any number of additional or alternative tasks, the tasks shown in FIGS. 4-7 need not be performed in the illustrated order, and processes 400-700 may be incorporated into a more comprehensive procedure or process having additional functionality not described in detail herein. Moreover, one or more of the tasks shown in FIGS. 4-7 could be omitted from an embodiment of one or more of the processes 400-700, as long as the intended overall functionality remains intact.

It will be appreciated that the search promotion server 130 of FIG. 1 may be implemented in the context of a wide range of database architectures. In that regard, FIG. 8 depicts an exemplary multi-tenant system suitable for implementation of the systems and methods described herein. That is, the various devices 804 may correspond to devices 140 of FIG. 1, while the subset-matcher dataset 132 may be stored within multi-tenant database 1030.

Figure 10:
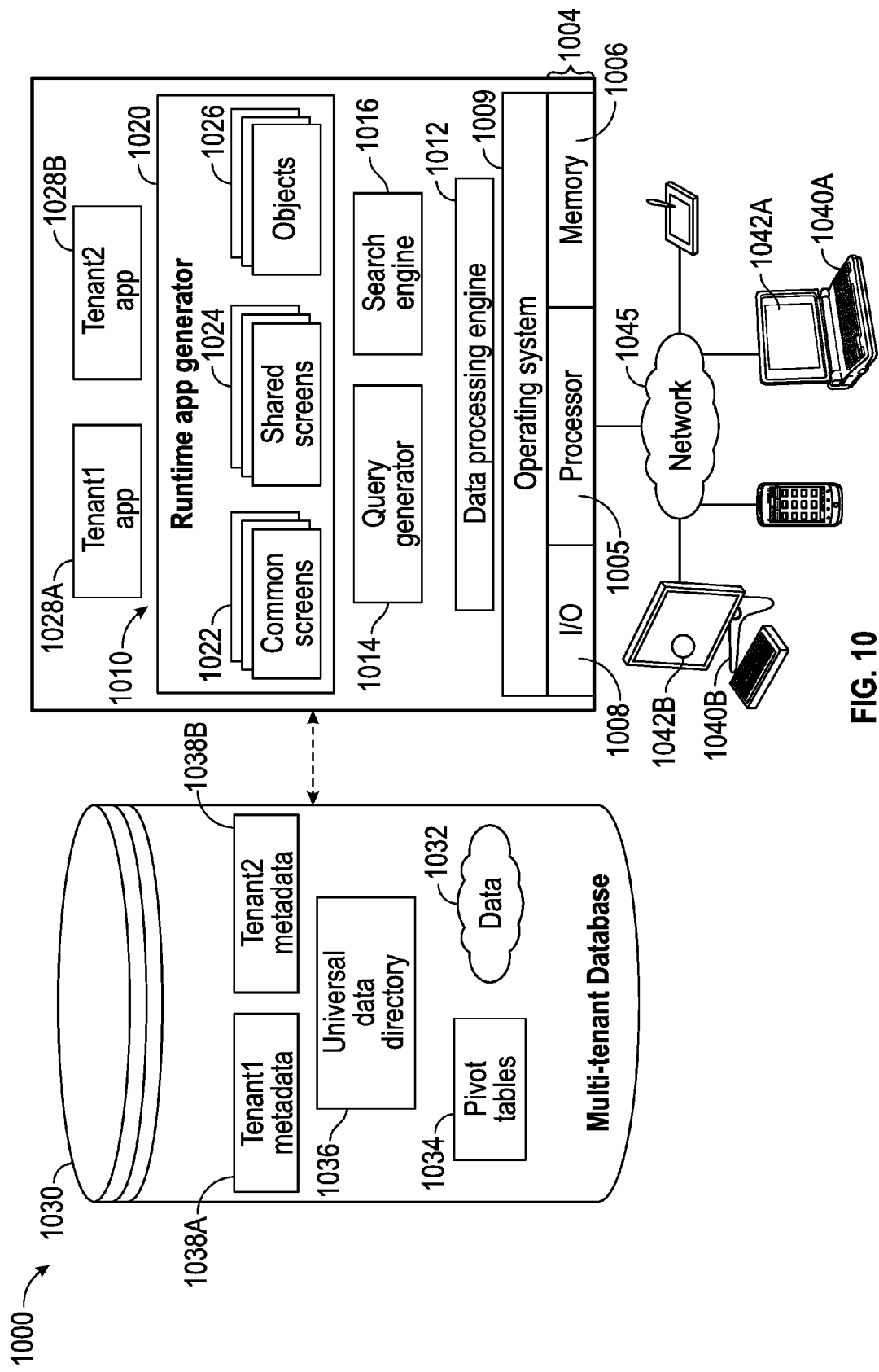
FIG. 10 is a conceptual block diagram of a multi-tenant system in accordance with one embodiment.

The multi-tenant system 1000 of FIG. 10 includes a server 1002 that dynamically creates and supports virtual applications 1028 based upon data 1032 from a common database 1030 that is shared between multiple tenants, alternatively referred to herein as a multi-tenant database. Data and services generated by the virtual applications 1028 are provided via a network 1045 to any number of client devices 1040, as desired. Each virtual application 1028 is suitably generated at run-time (or on-demand) using a common application platform 1010 that securely provides access to the data 1032 in the database 1030 for each of the various tenants subscribing to the multi-tenant system 1000. In accordance with one non-limiting example, the multi-tenant system 1000 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 1030. In this regard, each tenant includes one or more users associated with, assigned to, or otherwise belonging to that respective tenant. To put it another way, each respective user within the multi-tenant system 1000 is associated with, assigned to, or otherwise belongs to a particular tenant of the plurality of tenants supported by the multi-tenant system 1000. Tenants may represent customers, customer departments, business or legal organizations, and/or any other entities that maintain data for particular sets of users within the multi-tenant system 1000 (i.e., in the multi-tenant database 1030). For example, the application server 1002 may be associated with one or more tenants supported by the multi-tenant system 1000. Although multiple tenants may share access to the server 1002 and the database 1030, the particular data and services provided from the server 1002 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 1032 belonging to or otherwise associated with other tenants.

The multi-tenant database 1030 is any sort of repository or other data storage system capable of storing and managing the data 1032 associated with any number of tenants. The database 1030 may be implemented using any type of conventional database server hardware. In various embodiments, the database 1030 shares processing hardware 1004 with the server 1002. In other embodiments, the database 1030 is implemented using separate physical and/or virtual database server hardware that communicates with the server 1002 to perform the various functions described herein. In an exemplary embodiment, the database 1030 includes a database management system or other equivalent software capable of determining an optimal query plan for retrieving and providing a particular subset of the data 1032 to an instance of virtual application 1028 in response to a query initiated or otherwise provided by a virtual application 1028. The multi-tenant database 1030 may alternatively be referred to herein as an on-demand database, in that the multi-tenant database 1030 provides (or is available to provide) data at run-time to on-demand virtual applications 1028 generated by the application platform 1010.

In practice, the data 1032 may be organized and formatted in any manner to support the application platform 1010. In various embodiments, the data 1032 is suitably organized into a relatively small number of large data tables to maintain a semi-amorphous "heap"-type format. The data 1032 can then be organized as needed for a particular virtual application 1028. In various embodiments, conventional data relationships are established using any number of pivot tables 1034 that establish indexing, uniqueness, relationships between entities, and/or other aspects of conventional database organization as desired. Further data manipulation and report formatting is generally performed at run-time using a variety of metadata constructs. Metadata within a universal data directory (UDD) 1036, for example, can be used to describe any number of forms, reports, workflows, user access privileges, business logic and other constructs that are common to multiple tenants. Tenant-specific formatting, functions and other constructs may be maintained as tenant-specific metadata 1038 for each tenant, as desired. Rather than forcing the data 1032 into an inflexible global structure that is common to all tenants and applications, the database 1030 is organized to be relatively amorphous, with the pivot tables 1034 and the metadata 1038 providing additional structure on an as-needed basis. To that end, the application platform 1010 suitably uses the pivot tables 1034 and/or the metadata 1038 to generate "virtual" components of the virtual applications 1028 to logically obtain, process, and present the relatively amorphous data 1032 from the database 1030.

The server 1002 is implemented using one or more actual and/or virtual computing systems that collectively provide the dynamic application platform 1010 for generating the virtual applications 1028. For example, the server 1002 may be implemented using a cluster of actual and/or virtual servers operating in conjunction with each other, typically in association with conventional network communications, cluster management, load balancing and other features as appropriate. The server 1002 operates with any sort of conventional processing hardware 1004, such as a processor 1005, memory 1006, input/output features 1008 and the like. The input/output features 1008 generally represent the interface(s) to networks (e.g., to the network 1045, or any other local area, wide area or other network), mass storage, display devices, data entry devices and/or the like. The processor 1005 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 1006 represents any non-transitory short or long term storage or other computer-readable media capable of storing programming instructions for execution on the processor 1005, including any sort of random access memory (RAM), read only memory (ROM), flash memory, magnetic or optical mass storage, and/or the like. The computer-executable programming instructions, when read and executed by the server 1002 and/or processor 1005, cause the server 1002 and/or processor 1005 to create, generate, or otherwise facilitate the application platform 1010 and/or virtual applications 1028 and perform one or more additional tasks, operations, functions, and/or processes described herein. It should be noted that the memory 1006 represents one suitable implementation of such computer-readable media, and alternatively or additionally, the server 1002 could receive and cooperate with external computer-readable media that is realized as a portable or mobile component or application platform, e.g., a portable hard drive, a USB flash drive, an optical disc, or the like.

The application platform 1010 is any sort of software application or other data processing engine that generates the virtual applications 1028 that provide data and/or services to the client devices 1040. In a typical embodiment, the application platform 1010 gains access to processing resources, communications interfaces and other features of the processing hardware 1004 using any sort of conventional or proprietary operating system 1009. The virtual applications 1028 are typically generated at run-time in response to input received from the client devices 1040. For the illustrated embodiment, the application platform 1010 includes a bulk data processing engine 1012, a query generator 1014, a search engine 1016 that provides text indexing and other search functionality, and a runtime application generator 1020. Each of these features may be implemented as a separate process or other module, and many equivalent embodiments could include different and/or additional features, components or other modules as desired.

The runtime application generator 1020 dynamically builds and executes the virtual applications 1028 in response to specific requests received from the client devices 1040. The virtual applications 1028 are typically constructed in accordance with the tenant-specific metadata 1038, which describes the particular tables, reports, interfaces and/or other features of the particular application 1028. In various embodiments, each virtual application 1028 generates dynamic web content that can be served to a browser or other client program 1042 associated with its client device 1040, as appropriate.

The runtime application generator 1020 suitably interacts with the query generator 1014 to efficiently obtain multi-tenant data 1032 from the database 1030 as needed in response to input queries initiated or otherwise provided by users of the client devices 1040. In a typical embodiment, the query generator 1014 considers the identity of the user requesting a particular function (along with the user's associated tenant), and then builds and executes queries to the database 1030 using system-wide metadata 1036, tenant specific metadata 1038, pivot tables 1034, and/or any other available resources. The query generator 1014 in this example therefore maintains security of the common database 1030 by ensuring that queries are consistent with access privileges granted to the user and/or tenant that initiated the request. In this manner, the query generator 1014 suitably obtains requested subsets of data 1032 accessible to a user and/or tenant from the database 1030 as needed to populate the tables, reports or other features of the particular virtual application 1028 for that user and/or tenant.

Still referring to FIG. 10, the data processing engine 1012 performs bulk processing operations on the data 1032 such as uploads or downloads, updates, online transaction processing, and/or the like. In many embodiments, less urgent bulk processing of the data 1032 can be scheduled to occur as processing resources become available, thereby giving priority to more urgent data processing by the query generator 1014, the search engine 1016, the virtual applications 1028, etc.

In exemplary embodiments, the application platform 1010 is utilized to create and/or generate data-driven virtual applications 1028 for the tenants that they support. Such virtual applications 1028 may make use of interface features such as custom (or tenant-specific) screens 1024, standard (or universal) screens 1022 or the like. Any number of custom and/or standard objects 1026 may also be available for integration into tenant-developed virtual applications 1028. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 1026 such as "account" objects, "opportunity" objects, "contact" objects, or the like. The data 1032 associated with each virtual application 1028 is provided to the database 1030, as appropriate, and stored until it is requested or is otherwise needed, along with the metadata 1038 that describes the particular features (e.g., reports, tables, functions, objects, fields, formulas, code, etc.) of that particular virtual application 1028. For example, a virtual application 1028 may include a number of objects 1026 accessible to a tenant, wherein for each object 1026 accessible to the tenant, information pertaining to its object type along with values for various fields associated with that respective object type are maintained as metadata 1038 in the database 1030. In this regard, the object type defines the structure (e.g., the formatting, functions and other constructs) of each respective object 1026 and the various fields associated therewith.

Still referring to FIG. 10, the data and services provided by the server 1002 can be retrieved using any sort of personal computer, mobile telephone, tablet or other network-enabled client device 1040 on the network 1045. In an exemplary embodiment, the client device 1040 includes a display device, such as a monitor, screen, or another conventional electronic display capable of graphically presenting data and/or information retrieved from the multi-tenant database 1030. Typically, the user operates a conventional browser application or other client program 1042 executed by the client device 1040 to contact the server 1002 via the network 1045 using a networking protocol, such as the hypertext transport protocol (HTTP) or the like. The user typically authenticates his or her identity to the server 1002 to obtain a session identifier ("SessionID") that identifies the user in subsequent communications with the server 1002. When the identified user requests access to a virtual application 1028, the runtime application generator 1020 suitably creates the application at run time based upon the metadata 1038, as appropriate. As noted above, the virtual application 1028 may contain Java, ActiveX, or other content that can be presented using conventional client software running on the client device 1040; other embodiments may simply provide dynamic web or other content that can be presented and viewed by the user, as desired.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to on-demand applications, console systems, user interfaces, web browsers, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

In summary, what has been described are improved systems and method for managing user interfaces, such as consoles or "control panels" associated with database systems, providing a user interface scheme in which certain components of the main workspace can be "popped-out" in such a way that they may be advantageously arranged by the user over one or more monitors. At the same time, operations performed on the main workspace are reflected in the appropriate pop-up window(s) and/or operations performed within the pop-up window(s) are reflected in the main workspace (and, optionally, other pop-up windows).

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method for presenting search results, the method comprising:
    creating subset-matcher data for identifying documents for promotion, by:
        defining a set of search promotion rules, each of the set of search promotion rules including a set of user input search query terms and at least one corresponding document identifier;
        sorting each set of user input search query terms according to a sorting scheme, to produce a revised set of search promotion rules; and
        storing the revised set of search promotion rules as a trie data structure with a set of edges and a set of nodes, wherein the subset-matcher data comprises the trie data structure, wherein each of the set of nodes corresponds to one of the at least one document identifier, wherein each of the set of edges corresponds to one of the set of user input search query terms, and wherein each of the set of nodes is associated with a key defined by node position in the trie data structure;
    receiving a user input search query comprising search query terms, wherein the set of user input search query terms includes the search query terms;
    obtaining, from a search engine, a first set of search results responsive to the user input search query;
    identifying a promoted set of search results for promotion using the trie data structure for the revised set of search promotion rules, by:
        sorting the search query terms according to the sorting scheme, to create sorted search query terms;
        browsing the subset-matcher data using the trie data structure and the sorted query terms, to locate matching search promotion rules of the revised set of search promotion rules; and
        identifying the documents associated with the matching search promotion rules, wherein the promoted set of search results comprises the documents;
    revising the first set of search results, based on the identified promoted set, to create a second set of search results; and
    presenting the second set of search results, wherein the second set of search results includes the first set of search results and the promoted set in a promoted position.

2. The method of claim 1, wherein revising the first set of search results further comprises:
    recognizing a sequence of the first set of search results; and associating the promoted set in the sequence with the promoted position in the sequence, to produce a new sequence of the first set of search results;

reordering the first set of search results according to the new sequence to create the second set of search results.

3. The method of claim 2, wherein the promoted position comprises a first position in the sequence.

4. The method of claim 1, further comprising:

sorting and removing duplicates from each set of terms in the set of search promotion rules to produce a revised set of search promotion rules; and identifying the promoted set of search results for promotion, based on the revised set of search promotion rules.

5. A computer system implemented as a server, the computer system comprising:

a memory element, configured to store a set of search promotion rules, each search promotion rule including a set of terms and a corresponding document identifier;

a network communication device, configured to receive a search-query and to transmit search results;

at least one processor, communicatively coupled to the memory element and the network communication device, the at least one processor configured to:

create subset-matcher data for identifying documents for promotion, by:

defining a set of search promotion rules, each of the set of search promotion rules including a set of user input search query terms and at least one corresponding document identifier;

sorting each set of user input search query terms according to a sorting scheme, to produce a revised set of search promotion rules; and storing the revised set of search promotion rules as a trie data structure with a set of edges and a set of nodes, wherein the sub set-matcher data comprises the trie data structure, wherein each of the set of nodes corresponds to one of the at least one document identifier, wherein each of the set of edges corresponds to one of the set of user input search query terms, and wherein each of the set of nodes is associated with a key defined by node position in the trie data structure;

receive a user input search query comprising search query terms, wherein the set of user input search query terms includes the search query terms;

obtain, from a search engine, a first set of search results responsive to the user input search query;

identify a promoted set of search results for promotion using the trie data structure for the revised set of search promotion rules, by:

sorting the search query terms according to the sorting scheme, to create sorted search query terms;

browsing the subset-matcher data using the trie data structure and the sorted query terms, to locate matching search promotion rules of the revised set of search promotion rules; and identifying the documents associated with the matching search promotion rules, wherein the promoted set of search results comprises the documents;

revise the first set of search results, based on the identified promoted set, to create a second set of search results; and initiate transmission, via the network communication device, of the second set of search results, wherein the second set of search results includes the first set of search results and the promoted set in a promoted position.

6. The computer system of claim 5, wherein the at least one processor is further configured to revise the first set of search results by:

recognizing a sequence of the first set of search results; and associating the promoted set of search results in the sequence with the promoted position in the sequence, to produce a new sequence of the first set of search results;

reordering the first set of search results according to the new sequence to create the second set of search results.

7. The computer system of claim 6, wherein the promoted position comprises a first position in the sequence.

8. The computer system of claim 5, wherein the at least one processor is further configured to:

sort each set of terms in the set of search promotion rules, according to a sorting scheme, to produce a revised set of search promotion rules;

identify search query terms of the user input search query;

sort the search query terms according to the sorting scheme; and identify the promoted set of search results for promotion, based on the sorted search query terms and the revised set of search promotion rules.

9. The computer system of claim 5, wherein the at least one processor is further configured to:

sort and remove duplicates from each set of terms in the set of search promotion rules to produce a revised set of search promotion rules; and identify the promoted set of search results for promotion, based on the revised set of search promotion rules.

10. A non-transitory, computer-readable medium containing instructions thereon, which, when executed by a processor, are capable of performing a method comprising:

creating subset-matcher data for identifying documents for promotion, by:

defining a set of search promotion rules applicable to presentation of search results according to a promotion sequence, each of the set of search promotion rules including a set of user input search query terms and at least one corresponding document identifier;

sorting each set of user input search query terms according to a sorting scheme, to produce a revised set of search promotion rules; and storing the revised set of search promotion rules as a trie data structure with a set of edges and a set of nodes, wherein the subset-matcher data comprises the trie data structure, wherein each of the set of nodes corresponds to one of the at least one document identifier, wherein each of the set of edges corresponds to one of the set of user input search query terms, and wherein each of the set of nodes is associated with a key defined by node position in the trie data structure;

receiving a user input search query comprising search query terms, wherein the set of user input search query terms includes the search query terms;

obtaining, from a search engine, a first set of search results responsive to the user input search query;

identifying promoted search results of a set of documents managed by a search engine, using the trie data structure for the revised set of search promotion rules, by:

sorting the search query terms according to the sorting scheme, to create sorted search query terms;

browsing the subset-matcher data using the trie data structure and the sorted query terms, to locate matching search promotion rules of the revised set of search promotion rules; and identifying the documents associated with the matching search promotion rules, wherein the promoted search results comprises the documents;

adjusting a presented list of the search results, based on the promoted search results, to generate an adjusted list that corresponds to the promotion sequence; and presenting the adjusted list.

11. The non-transitory, computer-readable medium of claim 10, wherein the method further comprises:

recognizing a sequence of the presented list of the search results; and associating the promoted search results in the sequence with at least a top position in the sequence, to produce a new sequence of the search results;

reordering the presented list of the search results according to the new sequence to create the adjusted list.

12. The non-transitory, computer-readable medium of claim 10, wherein the method further comprises:

sorting and removing duplicates from each set of terms in the set of search promotion rules to produce a revised set of search promotion rules; and identifying the promoted search results, based on the revised set of search promotion rules.

* * * * *